United States Patent Office 2,846,556
Patented Aug. 5, 1958

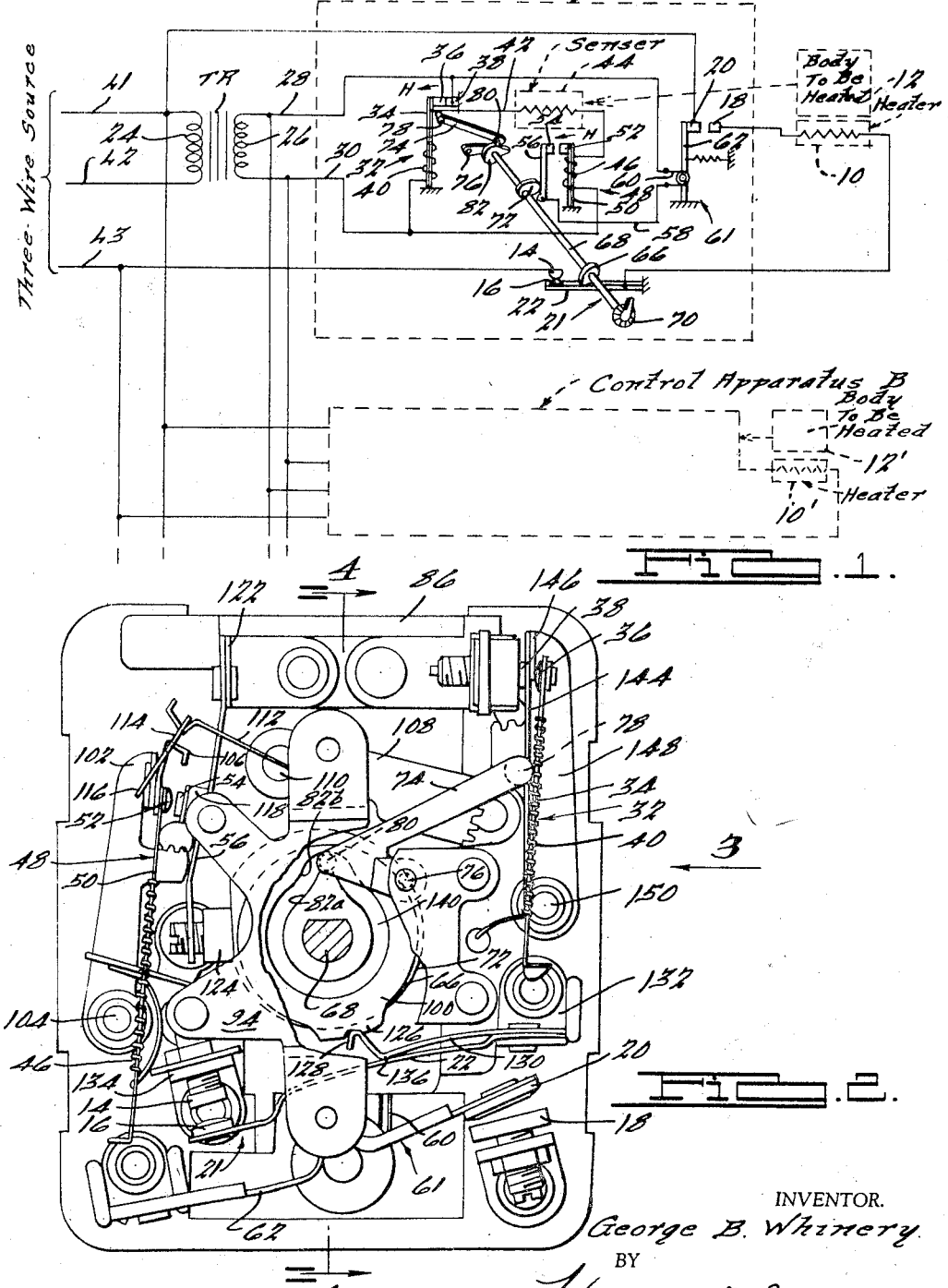

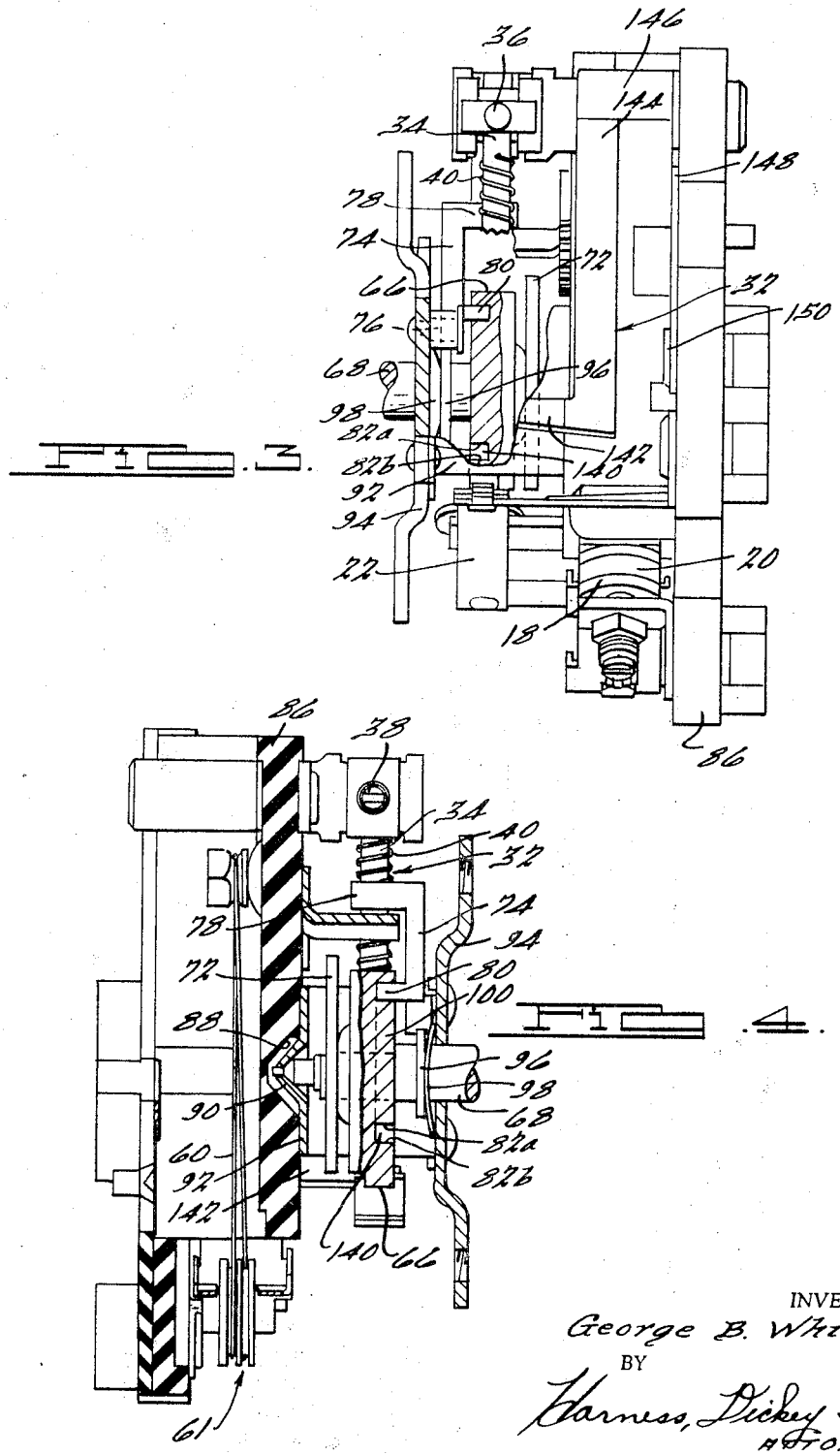

2,846,556

TEMPERATURE CONTROLLING APPARATUS

George B. Whinery, Ann Arbor, Mich., assignor to King-Seeley Corporation, Ann Arbor, Mich., a corporation of Michigan Application November 7, 1956, Serial No. 620,937

8 Claims. (Cl. 219—20)

This invention relates to temperature controlling systems.

In my copending application Serial No. 604,867, filed August 20, 1956, an improved thermal-responsive system is disclosed which is adapted to so control a heating means in heat transfer relation with a body to be heated as to maintain or controllably vary the temperature of the body. The present invention constitutes a further improvement upon the invention there disclosed, and the full disclosure of that application, of the application of E. Sivacek, Serial No. 604,917, filed August 20, 1956, relating to a thermo-responsive device and method of manufacture thereof, and of the application of E. Sivacek, Serial No. 604,918, filed August 20, 1956, relating to a thermal relay are intended to be incorporated herein by reference as fully as if those disclosures had been reproduced verbatim as elements of the present disclosure.

An object of the present invention is to incorporate in a temperature controlling system integral means for selectively enabling and disabling the system or portions thereof to operate.

Another object of the invention is to provide a single manually controllable operator for selectively disabling both a controlled and a controlling circuit.

Another object of the present invention is to provide manually actuatable means for selectively and independently enabling and disabling each of a plurality of temperature controlling circuits supplied with electrical energy from a common source.

Another object of the present invention is to control a plurality of electrical-contact controlling elements with a single manually actuatable operator.

The manner of accomplishing the foregoing objects, and other objects of the invention, will appear from the following detailed description of an embodiment of the invention when read with reference to the accompanying drawings in which:

Figure 1 is a schematic representation of circuitry embodying certain of the principles of the present invention;

Figure 2 is a front elevational view of an equipment embodying certain of the principles of the present invention and including portions of the elements of the circuit of Figure 1, with certain parts being cut away for clarity;

Figure 3 is a side elevational view of the mechanism illustrated in Figure 2, taken in the direction of the arrow 3 on Figure 2; and Figure 4 is a sectional view taken substantially along the line 4—4 of Figure 2.

Referring first to Figure 1 of the drawings, the system comprises a plurality of control apparatuses such as control apparatus A and control apparatus B which are or may be identical to one another and which are supplied from a common source of electrical energy, representatively shown as a three-wire alternating voltage source for applying alternating voltages between line conductors L1, L2 and L3. It may be assumed, for example, that the source is adapted to establish between conductors L1 and L2 a 110-volt alternating voltage, to establish between conductors L2 and L3 a 110-volt alternating voltage and to establish between conductors L1 and L3 a 220-volt alternating voltage.

Each of the control apparatuses is arranged to control a heating means, such as heater 10 associated with control apparatus A and heater 10' associated with control apparatus B. The heaters are disposed in heat transfer relationship with a body to be heated, such as body 12 or 12', respectively, and the energization of the heaters is controlled so that the body will be brought to a selected temperature and then maintained indefinitely at that temperature. The heaters 10 and 10' may, for example, be the surface units of a cooking stove, with the body to be heated comprising a pot or pan filled with material to be heated disposed upon those surface units.

Control apparatus A, representative of the several control apparatuses, functions selectively to connect the resistance heater 10 across lines L1 and L3 so as selectively to apply 220 volts, with the assumed supply voltage, across that heating means. The output circuit extends from line L3, through contacts 14 and 16, arm 22, through the resistance element of heater 10, and through contacts 18 and 20 to line L1. Contact 14 is assumed to be fixed or adjustably fixed while contact 16 is carried upon an arm 22 illustratively mounted as a cantilever and controlled, in a manner to be described, so that contacts 14 and 16 constitute an on/off switch for disabling or enabling the output circuit. The relative positions of contacts 18 and 20 are determined and varied by a controlling circuit so as to control the heat output from heater 10.

Since it is desired to operate the control circuit at a low voltage, a step-down voltage transformer TR is interposed the source and the control circuit. Primary winding 24 of transformer TR is connected between line conductors L1 and L2 so as to be continuously energized whenever those line conductors are connected to the source. It will of course be appreciated that the primary winding 24 may be connected between conductors L2 and L3 or, with an appropriate shift in the turns ratio, between conductors L1 and L3.

The output voltage across the secondary winding 26 of transformer TR appears between conductors 28 and 30 which are multipled to each of the several control apparatuses. In each of the control apparatuses, this voltage is applied to a pulsating means 32 comprising a polymetallic leg 34 supported at one end in a manner to be described and carrying an electrical contact 36 at the other end. Contact 36 is normally engaged with a fixed or adjustably fixed contact 38 which is connected to conductor 28. Under this condition, current flows from conductor 28, through contacts 38 and 36 to polymetallic element 34, through heater winding 40 connected to and disposed in heat transfer relationship with element 34, and to conductor 30. That current will result in the generation of heat by winding 40 and a resultant elevation of the temperature of bimetallic strip 34. Strip 34 deflects, upon heating, in a direction to separate contacts 36 and 38. When that separation occurs, winding 40 is deenergized and polymetallic element 34 cools until contact 36 is again deflected into engagement with contact 38, reestablishing the initial conditions. As a result, device 32 operates as a self-interrupting pulser, cyclically opening and closing contacts 36 and 38 so as cyclically to apply the voltage appearing between conductors 28 and 30, between conductor 42, connected to element 34 and conductor 30. As is discussed in my above-noted copending application, the voltage output of the pulsating device 32, that is, the average voltage between conductors 42 and 30, will tend to remain constant despite variations in the source voltage, so that device 32 tends to act as a voltage regulator.

The voltage between conductors 42 and 30 is applied across a series circuit including a sensor 44 and a heater winding 46. Sensor 44 is disposed in heat transfer relation with the body 12 to be heated and comprises a resistance element having a high temperature co-efficient of resistance. In the representative arrangement disclosed, this co-efficient is positive. Heater winding 46 is disposed in heat transfer relationship with a polymetallic strip 50 mounted as a cantilever and carrying a moving contact 52 adapted to engage a passive contact 54 supported upon an arm 56 the position of which is manually adjustable in a manner to be described. In the illustrated arrangement, polymetallic strip 50 is so pre-stressed that contact 52 is separated from contact 54 when that strip is cool, and the constituent elements of the polymetallic strip are so arranged that upon heating thereof, contact 52 will be deflected towards contact 54.

In the operation of the control circuit in accordance with the principles of my above identified co-cpending application, the pulsing frequency of the regulator 32 is sufficiently low so that responder 48 can follow the pulses, the contacts 52—54 being opened and closed each pulse cycle, at least in the regulating range, and with the on/off ratio of the responder's operation being determined by the resistance value of sensing means 44. However, it is not important to the principles of the present invention whether the control circuit operates on a purely thermostatic basis or whether it operates on a pulsing basis, and whether, if the latter, the pulsing is accomplished in the manner described in my co-pending application or otherwise.

While relay means 48 controls the output circuit and the energization of heating means 10, that control is illustrated to be indirect in view of the magnitude of the current which must be handled. The closure of contacts 52—54 completes a circuit from conductor 30, through strip 50, through those contacts, arm 56, conductor 58, resistance wire 60 and to conductor 28 so that resistance wire 60 is connected across the secondary winding 26 of transformer TR. Resistance wire 60, an element of thermal or hot-wire relay 61, has a high temperature co-efficient of linear expansion and serves, when heated, to permit cantilever-mounted spring arm 62 to move contact 20 into engagement with contact 18, the closure of those contacts connecting heater 10 across conductors L1 and L3.

It will therefore be seen that in each of the control apparatuses, such as control apparatus A, a controlling circuit is provided including a sensor 44, in heat transfer relationship with the body 12 to be heated, and a winding of the relay means 48, energy being provided to that controlling circuit from the secondary winding 26, as a source of voltage, and through a pulsating means 32. The controlling circuit operates through a circuit including secondary winding 26, contacts 54 and 52 and winding 60 of relay means 61 to control a controlled or output circuit including line L1, contacts 18 and 20, heating means 10, arm 22, contacts 14 and 16 and line L3, both of those pairs of contacts serving to control that output circuit.

The condition of switch 21 is controlled by a single-lobe cam 66 keyed to a rotatively mounted shaft 68, shaft 68 being rotatable by means of a manually actuatable operator 70 in the form of a knob which may have a pointer cooperating with scale.

Shaft 68 also carries a cam 72 against which arm 56 is biased so that the static condition of contact 54 will be determined by the position of cam 72 and hence by the position of operator 70. As is discussed in detail in my above identified co-pending application, the position of contact 54, as thus determined, can determine or set the temperature at which the body 12 will be maintained. Cam 72 is preferably provided with a rise over the major portion of its circumference to spread the total temperature range over a relatively large portion of one revolution of the operator 70. Cam 66, on the other hand, is provided with but a single lobe. At one position of shaft 68 and operator 70, the "off" position, that lobe engages and deflects arm 22 to separate contact 16 from contact 14 to interrupt the output circuit. In all other positions of shaft 68, operator 70 and cam 66, the contacts 16 and 14 are closed.

With operator 70 turned to its "off" position, the output circuit through heater 10 is interrupted since contacts 14 and 16 are open but, if only the thus-far described equipment were provided, the pulsating means 32 and the relay means 48 and 61 would continue to operate. In the arrangement disclosed in my above-identified co-pending application, such continuous actuation of the controlling circuit even though the operator is set to its "off" position is avoided by placing there counterparts of contacts 14 and 16 in series not only with the main heater 10 but also with the primary winding of the voltage step down transformer. However, if a plurality of control apparatuses are provided, such an arrangement necessitates an individual voltage step down transformer for each control apparatus.

In the here disclosed arrangement, means are provided for interrupting and disabling the controlling circuit, under the control of the manually actuatable operator, without disconnecting the transformer from the source, so that a single transformer may serve a plurality of control apparatuses. Furthermore, the selective disablement of the individual control apparatuses is accomplished, in the representatively disclosed arrangement, without the provision of any additional electrical contacts.

It will be recalled that the pulsating means 32 includes a pair of contacts 36 and 38 which are in series with the circuit including the winding 40 of that pulsating means as well as in series with the controlling circuit including sensor 44 and heater winding 46 of responder relay 48. If contacts 36 and 38 are maintained open, therefore, neither of those circuits will be energizable and, as a consequence, contacts 52 and 54 will not become closed so that the circuit including heater wire 60 will also not become energized. The means for selectively disabling the controlling circuit in apparatus A comprises means for preventing contacts 36 and 38 from closing. In the preferred arrangement, as schematically represented in Figure 1, a lever 74 is pivotally mounted at one end, as at pivot 76, and carries at the other end a projection 78 adapted to engage a portion of the polymetallic element 34 of the pulsating means 32. A laterally extending pin 80 at a point intermediate the ends of lever 74 serves as a cam follower, engaging the surface of a cam 82 keyed to shaft 68. Cam 82 has, in effect, a single lobe. When the cam follower 80 rides upon that lobe, lever 74 is pivoted to bring projection 78 into engagement with polymetallic element 34 and to force that polymetallic element from its shown position to a position in which contact 36 is separated from contact 38, disabling the controlling circuit in the manner above noted. Cam 82 is positioned upon shaft 68 so that this disabling occurs when manually actuatable operator 70 is in its "off" position. At any other position of cam 82, lever 74 is pivoted to the shown position in which projection 78 is out of contact with polymetallic element 34 and in no way interferes with the operation of the pulsating means 32.

Except for certain modifications to be described, the structure represented in Figures 2 to 4 of the drawings is, for the most part, similar to that disclosed and described in detail in the above-identified applications and reference may be had thereto for a more complete description of the elements.

The structure represented in Figures 2 to 4 includes the pulsating device 32, the responding relay 48, of the relay 61, the switch 21 and the controlling shaft and cams, but the transformer TR, the heater 10 the body 12 and the sensor 44 are not illustrated and are normally physically remote from the structure shown.

The several elements are mounted upon a molded base 86 of insulating material a central portion of which is provided with a recess 88 (Fig. 4) for accepting the conical seat portion 90 of arbor or shaft mounting frame 92. Frame 92, secured to the mounting base 86 in any suitable manner, is generally cup shaped with its open end being covered by a bridge 94 secured to the frame 92 in any appropriate manner as by riveting.

The arbor or shaft 68 is supported between mounting frame 92 and bridge 94, the frusto-conical end of shaft 68 resting in the conical seat 90 in the mounting frame 92. A split ring 96 is seated in an annular slot in the shaft 68 and spring washer 98 is trapped between ring 96 and the rear face of bridge 94 so that it exerts a continuing force tending to maintain shaft 68 in conical seat 90. Shaft 68 extends forwardly (to the right in the view of Figure 4) of the bridge 94 to accept the knob or operator 70 shown in Figure 1.

Shaft 68 carries two cam members. One of these cam members is the responder controlling cam 72 which is secured upon a reduced-diameter portion of shaft 68 (preferably with a keying flat). The other cam member 100 is preferably also keyed to shaft 68 and is provided with a plurality of cam surfaces 66, 82a and 82b.

As previously indicated, cam 72 cooperates with elements of the responder relay 48. The responder 48 includes a generally U-shaped polymetallic element including active leg portion 50 and a back or compensating leg lying in parallelism with leg 50 and hence not visible in Figure 2 of the drawings. The tip of the back or compensating leg is secured to an arm 102 pivoted upon the base 86 at 104. The active contact 52 and a hooked projection 106 are riveted or otherwise secured to the free end of leg 50.

Means including projection 106 are provided for establishing an increasing force serving to oppose motion of the contact 42 in either direction from a selected position. Thus, an adjusting bracket 108 is pivotally secured to the base 86 by means of a rivet 110 and rigidly supports a link coupler 112 of spring material and provided with a hooked end portion. A link or frame 114 inter-relates spring elements 50 and 112 and is generally in the form of a fame engaging the knees of the hooked portion 106 and of the hooked end of the link coupler 112. A projection 116 extends from the frame portion of the link 114 to serve as a calibrating flag.

Passive contact 54 is supported upon a flange 118 integral with spring arm 56. Spring arm 56 is rigidly supported relative to the base 86 by bracket 122 and carries adjustably mounted cam follower 124 at its free end. Spring 56 is pre-tensioned so that cam follower 124 is continuously pressed against the cam surface 72.

Cam surface 66 at the periphery of cam member 100 is circular over the major portion of its circumference and is provided with a single, centrally indented lobe 126. Cam follower 128 is integral with a spring arm 130 which is riveted or otherwise secured to the upstanding leg of a mounting bracket 132 secured to the mounting base 86, the cam follower portion 128 being illustrated in engagement with the indentation in the lobe 126. The contact spring 22 of switch 21 is mounted essentially as a cantilever by the rivet which secures cam follower arm 130 to bracket 132. Electrical contact 16 is secured to the free end of spring 22 and is adapted to engage the screw-mounted passive contact 14 which is supported by mounting bracket 134 upon base 86. Both spring arm 22 and spring arm 130 are pre-stressed so that they tend to rotate through an angle in a clockwise direction in the view of Figure 2.

In the illustrated "off" position of the apparatus, with cam follower 128 engaging the notch in lobe 126, spring 22 is pevented from bringing contact 16 into engagement with contact 14 by the abutment thereof with the knee portion 136 on cam follower spring 130. As shaft 68 is rotated in either direction, cam follower 128 rides out of the indentation in lobe 126 along, and off of lobe 126. When this occurs, the contact spring 22 is enabled to deflect to bring contact 16 into engagement with contact 14 with adequate contacting force, so as partially to complete the output circuit including the heater 10 in the view of Figure 1.

A continuous channel 140 is formed, as during molding, in the face of cam 100 the side walls of that channel constituting cam surfaces 82a and 82b. The cylindrical cam follower 80 on the lever 74 engages channel 140 and is guided by same surfaces 82a and 82b. Lever 74 is pivotally supported by stud 76 (Figure 3) upon the bridge 94. In view of the illustrated orientation of the several parts, the portion of the lever 74 between cam follower 80 and the actuating projection 78 is disposed at a sharp angle to the portion of lever 74 between cam follower 80 and the pivotal point 76. Actuating projection 78 extends laterally of the lever 74, as may best be seen in Figure 4 of the drawings, so as to lie in proximity to and be engageable with the active leg 34 of the generally U-shaped polymetallic element which is a constituent part of pulsating device 32.

As may best be seen in Figure 3 of the drawings, the active leg 34 is joined, by means of a cross piece 142 to one end of a back or compensating leg 144, the other end of which is rigidly secured to an upstanding portion 146 of an adjusting bracket 148 pivotally secured to the base 86 by rivet 150.

With shaft 68 rotated to the shown "off" position, cam follower 80 is positioned at the peak of the cam surface 82a and at the peak of the recess in cam surface 82b so that lever 74 is rotated to its maximum clockwise position (in the view of Figure 2), moving projection 78 to the right into engagement with active leg 34 of pulsating element 32 and moving that leg portion a distance sufficiently great to separate contact 36 from passive contact 38, disabling the controlling circuit in the manner described. If shaft 68 is rotated in either direction, cam follower 80 will be guided along channel 140 between the camming walls 82a and 82b, rocking lever 74 in a counterclockwise direction to move projection 78 away from arm 34 to a position where it will not interfere with the operation of the pulsating device 32.

In this manner, a single manually actuatable operator may be employed to control contacts 14 and 16, constituting a switch in the output circuit, to control contacts 36 and 38 in the controlling circuit and to adjust the position of passive contact 54 to set the temperature at which the body to be heated will be maintained.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a system associable with a source of electrical energy for controlling a heating means in heat transfer relationship with a body to be heated, the combination of a voltage step-down transformer having a primary and a secondary winding, said primary winding being energizable from the source, a self-interrupting thermal relay including a heater energizable by said secondary winding, a polymetallic element controlled by said heater, and a first pair of electrical contacts, one of which is movable under the control of said polymetallic element, a second thermal relay including a heater energizable by said secondary winding and a second pair of electrical contacts, circuit means including said first pair of electrical contacts for periodically connecting both of said heaters to said transformer secondary winding, output means controlled by said second pair of electrical contacts for controlling the connection of the heating means to the source, a manually rotatable shaft, cam means driven by said shaft for adjusting the relationship between said second pair of contacts, and additional means controlled by said shaft and effective at one rotational position of said shaft for disconnecting said heaters from said secondary winding.

2. In a system associable with a source of electrical energy for controlling a heating means in heat transfer relationship with a body to be heated, the combination of a voltage step-down transformer having a primary and a secondary winding, said primary winding being energizable from the source, a self-interrupting thermal relay including a heater energizable by said secondary winding, a polymetallic element controlled by said heater, and a first pair of electrical contacts, one of which is movable under the control of said polymetallic element, a second thermal relay including a heater energizable by said secondary winding and a second pair of electrical contacts, circuit means including said first pair of electrical contacts for periodically connecting both of said heaters to said transformer secondary winding, output means controlled by said second pair of electrical contacts for controlling the connection of the heating means to the source, a manually rotatable shaft, cam means driven by said shaft for adjusting the relationship between said second pair of contacts, and additional means controlled by said shaft and effective at one rotational position of said shaft for disconnecting said heaters from said secondary winding comprising operating means driven by said shaft and engageable with said polymetallic element for physically moving said polymetallic element to a position wherein said first pair of electrical contacts are disengaged.

3. In a system associable with a source of electrical energy for controlling a heating means in heat transfer relationship with a body to be heated, the combination of a voltage step-down transformer having a primary and a secondary winding, said primary winding being energizable from the source, a self-interrupting thermal relay including a heater energizable by said secondary winding, a polymetallic element controlled by said heater, and a first pair of electrical contacts, one of which is movable under the control of said polymetallic element, a second thermal relay including a heater energizable by said secondary winding and a second pair of electrical contacts, circuit means including said first pair of electrical contacts for periodically connecting both of said heaters to said transformer secondary winding, output means controlled by said second pair of electrical contacts for controlling the connection of the heating means to the source, a manually rotatable shaft, cam means driven by said shaft for adjusting the relationship between said second pair of contacts, and additional means controlled by said shaft and effective at one rotational position of said shaft for disconnecting said heaters from said secondary winding comprising a cam on said shaft and lever means pivoted at a location spaced from said shaft and from said polymetallic element and engageable with said cam and with said polymetallic element for moving said polymetallic element to a position wherein said first pair of electrical elements are disengaged.

4. In a system associable with a source of electrical energy for controlling a heating means in heat transfer relationship with the body to be heated, the combination of a voltage step-down transformer having a primary and a secondary winding, said primary winding being energizable from the source, a self-interrupting thermal relay including a heater energizable by said secondary winding, a polymetallic element controlled by said heater, and a first pair of electrical contacts one of which is movable under the control of said polymetallic element, a second thermal relay including a heater energizable by said second winding and a second pair of electrical contacts, circuit means including said first pair of electrical contacts for periodically connecting both of said heaters to said transformer secondary winding, output means controlled by said second pair of electrical contacts and including a third pair of electrical contacts for controlling the connection of the heating means to the source, a manually rotatable shaft, cam means driven by said shaft for adjusting the relationship between said second pair of contacts, additional means controlled by said shaft and effective at one rotational position of said shaft for disconnecting said heaters from said secondary winding, a fourth pair of electrical contacts connected in series with said third pair of electrical contacts and with the source and the heating means, and means controlled by said shaft and effective at said one rotational position of said shaft for disconnecting the heating means from the source.

5. In a system associable with a source of electrical energy for controlling a heating means, a first thermal relay including a polymetallic element, a heater and a pair of electrical contacts for controlling the energization of the heater by the source so that said contacts repetitively open and close, a second thermal realy including a heater and a pair of electrical contacts, said electrical contacts of said first relay controlling the energization of said heater of said second relay, an output relay controlled by said electrical contacts of said second relay and having a pair of electrical contacts connectable in series with the heating means and the source for controlling the energization of the heating means by the source, a manually rotatable shaft, switch means controlled by said shaft and connectable in series with said contacts of said output device and with the heating means and source, cam means controlled by said shaft for controlling the relative positions of said electrical contacts of said second thermal relay, and means controlled by said shaft for selectively preventing energization of said heater of said first thermal relay from said source.

6. In a system associable with a source of electrical energy for controlling a heating means, a first thermal relay including a polymetallic element, a heater and a pair of electrical contacts for controlling the energization of the heater by the source so that said contacts repetitively open and close, a second thermal relay including a heater and a pair of electrical contacts, said electrical contacts of said first relay controlling the energization of said heater of said second relay, an output relay controlled by said electrical contacts of said second relay and having a pair of electrical contacts connectable in series with the heating means and the source for controlling the energization of the heating means by the source, a manually rotatable shaft, switch means controlled by said shaft and connectable in series with said contacts of said output device and with the heating means and source, cam means controlled by said shaft for controlling the relative positions of said electrical contacts of said second thermal relay, and means controlled by said shaft for selectively preventing energization of said heater of said first thermal relay from said source comprising operating means driven by said shaft and engageable with said polymetallic element of said first thermal relay for physically moving said polymetallic element to a position wherein said first pair of electrical contacts are disengaged.

7. In a system associable with a source of electrical energy for controlling the heat input from each of a plurality of heating means to bodies disposable in heat transfer relation with individual ones of the heating means, a transformer having a primary and a secondary winding, means connecting the primary winding to the source, a plurality of relay means for controlling the connection of the individual heating means to the source, and a control circuit for each of said relay means, said control circuits including sensing means in heat transfer relation with the individual bodies and pulsating means energizable from said secondary winding for controlling the energization of the respective relay means, said control circuits being connected in parallel with one another across said secondary winding, a manually actuatable operator for each of said control circuits, means controlled by and individual to each of said operators for selecting the temperature at which the individual bodies are to be maintained, and means controlled by and individual to each of said operators for interrupting the energization of the respective control circuits.

8. In a system associable with a source of electrical energy for controlling the heat input from each of a plurality of heating means to bodies disposable in heat transfer relation with individual ones of the heating means, a transformer having a primary and a secondary winding, means connecting the primary winding to the source, a control circuit for each of the heating means, each of said control circuits comprising relay means for controlling the individual heating means, sensing means in heat transfer relation with the individual bodies for controlling the respective relay means and pulsating means for supplying energy from said secondary winding to the sensing and relay means individual thereto, said control circuits being connected in parallel with one another across said secondary winding, a manually actuatable operator for each of said control circuits, and means controlled by and individual to each of said operators for disabling the individual ones of said pulsating means to supply energy from said secondary winding to the control circuit of which it is a part.

References Cited in the file of this patent

UNITED STATES PATENTS

| | | |
|---|---|---|
| 2,434,467 | McCormick | Jan. 13, 1948 |
| 2,498,127 | Kuhn | Feb. 21, 1950 |
| 2,510,038 | Rudahl | May 30, 1950 |
| 2,524,506 | Akeley | Oct. 3, 1950 |
| 2,727,973 | Collins | Dec. 20, 1955 |
| 2,790,057 | Schaver | Apr. 23, 1957 |

UNITED STATES PATENT OFFICE

CERTIFICATE OF CORRECTION

Patent No. 2,846,556 August 5, 1958

George B. Whinery

It is hereby certified that error appears in the printed specification of the above numbered patent requiring correction and that the said Letters Patent should read as corrected below.

Column 5, line 1, strike out "of"; line 48, for "fame" read -- frame --; column 6, line 2, for "pevented" read -- prevented --; line 16, for "same" read -- cam --; column 8, line 24, for "realy" read -- relay --; column 10, line 20, list of references cited, for "Schaver" read -- Schauer, Jr. --.

Signed and sealed this 24th day of February 1959.

(SEAL)
Attest:

KARL H. AXLINE
Attesting Officer

ROBERT C. WATSON
Commissioner of Patents